Aug. 20, 1963  G. M. PRATLEY  3,101,204
CABLE GLAND
Filed May 9, 1960

INVENTOR
George Montague Pratley
BY Watson, Cole, Grindle & Watson
ATTORNEYS

3,101,204
CABLE GLAND
George Montague Pratley, % Messrs. Pratley Manufacturing & Engineering Co. (Proprietary) Limited, Jackson St., Factoria, Krugersdorp, Republic of South Africa
Filed May 9, 1960, Ser. No. 27,616
Claims priority, application Republic of South Africa May 22, 1959
3 Claims. (Cl. 285—149)

This invention relates to a cable gland for making a connection between an equipment enclosure, hereinafter termed a box, and an electric cable having flexible metal armor.

Several varieties of cable glands are in use more especially for clamping the cable to distribution boxes when the armor for the cable is earthed through the gland to the box. However, difficulties are experienced in fitting the gland due to the variations in the armor, more generally in the diameter of the wire often used, but sometimes also in the form and pattern of its application. Another difficulty is that the hole for the cable to enter the box is sometimes too large for the gland to be properly centered consequently jeopardising the effectiveness of the earthing.

It is the object of this invention to provide a gland by the use of which the above difficulties are avoided.

In accordance with this invention for a cable gland wherein the armor of the cable is clamped in the gland between a tapered bush and a coned nut encircling the cable and screwed into the gland housing there is provided a screwed nipple, as a separate unit screwed into the gland, having its one end projecting from the gland and its other end abutting the end of said bush to regulate the amount of clamping.

The invention further provides for the projecting nipple to accommodate a fastening nut and for the screw threads on the nipple and on the coned nut to be differential.

The invention also provides a projection on the face of the gland about the nipple or on one face of the nut on the nipple to assist in centering the latter when fixing the gland to a box.

The invention is illustrated in the accompanying drawing in which.

Figure 1:
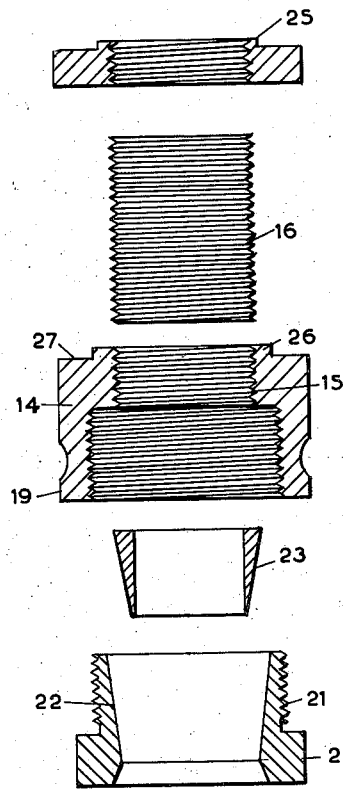
FIG. 1 shows an exploded view of the parts of a gland, partly in section.
Figure 2:
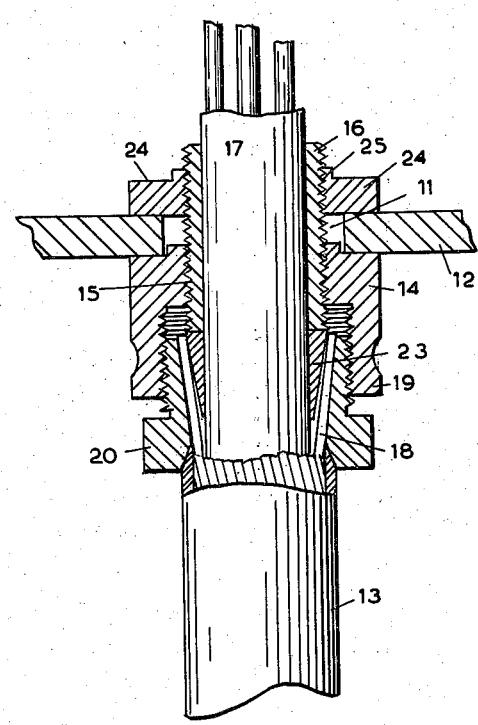
FIG. 2 is an assembled gland in section having an electrical cable mounted therein.

In the drawings, 11 shows a hole in a box 12 into which the armored cable 13 is to enter and be fastened therein by the gland.

The gland has a housing 14 which is bored right through. Its one end 15 is threaded to take a nipple 16 which is a separate unit and is adapted to slide over the part 17 of the cable 13. This is the part stripped of its armor 18 and adapted to project from the nipjple 16 and the latter is adapted to pass through the hole 11.

The other end 19 of the housing 14, and into which the end of nipple 16 projects, is enlarged to take a coned nut 20 which is bored to fit over the armor 18 of the cable 13. The coned nut 20 is screw threaded at 21 to fit into the enlargement in the bore of the housing 14 which is screw threaded for the purpose. The screw thread 21 is different in pitch to the thread on the nipple 16 for the purpose hereafter described. The bore of coned nut 20 is tapered at 22 to take the spreaded end of the armor 18 and a tapered bush 23 which has a bore to fit over the part 17 of the cable 13. The smaller end of bush 23 fits under the end of the armor 18 to spread it so that the armor 18 can be clamped between the tapered bore 22 of the coned nut 20 and the bush 23.

The top of the bush 23 is held in position by contact with the end of the nipple 16 so that as the coned nut 20 is screwed into the housing 14 the armor 18 becomes clamped.

It will be seen that if the armor 18 is thick and the nipple 16 is screwed down too far the bush 23 will not allow the threaded portion 21 to enter properly the housing 14. The position of the nipple 16 in the housing 14 will therefore regulate the grip on the armor 18 by the proper positioning of the tapered bush 23. Alternately, if the armor 18 is thin and the nipple 16 does not press sufficiently on the bush 23 the armor 18 may not be gripped.

The nipple 16 projects from the housing 14 sufficiently far to receive a fastening nut 24. This nut 24 serves to hold the gland in position in the box and therefore the cable 13, once the gland has been clamped on the latter.

It sometimes happens that the hole 11 is made to take a larger cable 13 and it is therefore a little difficult to center nipple 16 in the hole 11. To assist in centering the gland the nut 24 on one face has a small projecting spigot 25 round its bore. This spigot 25 will serve to center the nipple 16 in the hole 11 if the latter is on the large size. In an alternate arrangement a small spigot 26 may be made on the face 27 of the housing 14.

In making use of the cable gland, if there is a covering over the armor 18 of the cable 13 it is removed to expose the armor 18 for a suitable distance. The coned nut 20 is slipped over the armor 18. The armor 18 is cut to extend slightly beyond the tapered recess 22 in the coned nut 20.

The tapered bush 23 is slid over the covering 17 of the cable 13 and is forced under the armor 18 to spread it evenly round the outside of the taper. The taper of bush 23 and the taper 22 in the coned nut 20 are complementary so that the spread armor can be clamped between them.

The housing 14 of the gland is slid onto the end 17 of the cable 13 and screwed a short distance to engage the thread 21 of the coned nut 20.

The nipple 16 is now screwed into the end 15 of the housing 14 of the gland until it meets the end of the tapered bush 23. The clamping action of coned nut 20 can now be completed by screwing 21 into housing 14 to clamp the armor 18 between the tapered bush 23 and the tapered recess 22. The bush 23 cannot be pushed out owing to its abutment with nipple 16 and the nipple is not likely to be unscrewed in housing 14 during the tightening process because of the difference in the pitch of the screw thread on 21 and that on the nipple 16 as above referred to.

The nipple 16 projecting from end 15 of the housing 14 may now be passed through the hole 11 in the wall of the box 12. A nut 24 is screwed onto the nipple 16 to clamp the wall of the box 12 between itself and the end 15 of the housing 14.

If the hole 11 is too large for the nipple 16 the latter may be more easily centered by reversing the nut 24 so that the spigot 25 enters the hole. Alternately the small spigot 26 on face 27 of housing 14 may be used to center the gland in the hole 11.

This invention provides a cable gland embodying a screwed nipple which is a separate and replaceable unit in the gland and may be made of any suitable material. It has two functions that of regulating the position of the members clamping the armor in the gland and that of carrying the fastening nut for holding the gland in the box; said nut on said nipple also functioning, if required, to center the nipple in the hole in the box.

What I claim as new and desire to secure by Letters Patent is:

1. An electrical cable gland for mounting an armored cable in a mounting hole on a box, comprising in combination, a gland housing member having a smaller internal cylindrical surface separated by a shoulder area from a larger internal cylindrical cavity surface each surface being threaded, a tapered bush and a complementary substantially cylindrical internally coned nut having threads mating with those of said cylindrical cavity surface to thereby receive the tapered bush and armored cable internally in a position for clamping the cable armoring between the bush and coned nut, a screwed nipple of substantially cylindrical configuration with outer threads mating into the smaller cylindrical surface of the gland housing to extend beyond the shoulder and abut the tapered bush thereby regulating its position in the housing to accommodate armoring of various thicknesses, and a nut positionable upon the nipple to clamp the box to the housing member with the nipple extending through the mounting hole and thereby holding the nipple in position abutting the bush.

2. A gland as defined in claim 1, wherein the screw threads in the nipple and the screw threads on the coned nut are differential to thereby discourage a change of position of the coned nut as the mounting nut is adjusted.

3. A gland as defined in claim 1, wherein the housing has a spigot extending therefrom to center the nipple in a mounting hole of one diameter and the mounting nut has a spigot extending therefrom to center the nipple in a mounting hole of another diameter.

References Cited in the file of this patent

UNITED STATES PATENTS

| | | |
|---|---|---|
| 931,940 | Madden | Aug. 24, 1909 |
| 1,098,294 | Patty | May 26, 1914 |
| 1,268,978 | Kinnear | June 11, 1918 |
| 2,363,586 | Guarnaschelli | Nov. 28, 1944 |
| 2,394,632 | Parker | Feb. 12, 1946 |
| 2,485,280 | Grace | Oct. 18, 1949 |
| 2,685,907 | Waddell | Aug. 10, 1954 |
| 2,809,056 | Kaiser | Oct. 8, 1957 |
| 3,055,683 | Appleton | Sept. 25, 1962 |

FOREIGN PATENTS

| | | |
|---|---|---|
| 196,511 | Great Britain | Apr. 26, 1923 |
| 790,428 | Great Britain | Feb. 12, 1958 |